United States Patent
Klein et al.

(10) Patent No.: US 7,119,315 B2
(45) Date of Patent: Oct. 10, 2006

(54) CONTROL SYSTEM FOR MICROSCOPES

(75) Inventors: Stephan Klein, Eutin (DE); Christian Damiani, Luebeck (DE)

(73) Assignee: Fachhochschule Luebeck, Luebeck (DE)

( * ) Notice: Subject to any disclaimer, the term of this patent is extended or adjusted under 35 U.S.C. 154(b) by 86 days.

(21) Appl. No.: 10/991,184

(22) Filed: Nov. 17, 2004

(65) Prior Publication Data

US 2005/0109960 A1    May 26, 2005

(30) Foreign Application Priority Data

Nov. 21, 2003   (DE) ............... 103 54 747

(51) Int. Cl.
*G02B 7/04* (2006.01)
*G01B 11/26* (2006.01)

(52) U.S. Cl. .................. 250/201.3; 356/141

(58) Field of Classification Search ............. 250/201.3; 356/141, 141.4, 141.5, 139.03
See application file for complete search history.

(56) References Cited

U.S. PATENT DOCUMENTS

| 5,260,825 A | * | 11/1993 | Nagano et al. ............. 359/368 |
| 5,345,087 A | * | 9/1994 | Luber et al. ........... 250/559.29 |
| 6,394,602 B1 | | 5/2002 | Morrison et al. |

* cited by examiner

*Primary Examiner*—Georgia Epps
*Assistant Examiner*—Don Williams
(74) *Attorney, Agent, or Firm*—Larson & Larson, PA; Herbert W. Larson

(57) ABSTRACT

Control system for a microscope with a sensor unit, an evaluating unit and at least one drive unit, the sensor unit having at least one movement sensor, is fixed to the microscope and is aligned with the head of the microscope of the user for detecting head movements of the latter. The evaluating unit is constructed for calculating the data received by the sensor unit and for transmitting a control signal to the at least one drive unit, and the at least one drive unit is constructed for driving means set up for adjusting at least one physical characteristic of the microscope.

6 Claims, 3 Drawing Sheets

CONTROL SYSTEM FOR MICROSCOPES

PRIOR APPLICATIONS

This application bases priority on German Application No. DE 103 54 747. 9, filed on Nov. 21, 2003.

BACKGROUND OF THE INVENTION

1. Field of the Invention

The invention relates to a control system for the contactless control of parameters relating to a camera or microscope such as e.g. the focus, zoom and position relative to the object.

2. Description of the Prior Art

The problem often arises when handling cameras and microscopes that specific camera or microscope parameters have to be manually changed during the visual control by the eyepiece or viewfinder. This manual intervention generally leads to a deterioration of camera or microscope handling, because it is not only necessary to fix the object, but also the hands have to be observed during the manual manipulation. Particularly, in the case of surgery, a manual change to parameters of the optical aid is not possible because the surgeon already requires both hands for performing the operation and must, therefore, use third parties or other special aids. Such special aids are e.g. sensor systems which permit a contactless influencing of the parameters of a microscope.

Systems are already known which allow a contactless control of the focus and zoom of an optical instrument. U.S. Pat. No. 6,394,602 B1, describes a system for cameras and microscopes which determines the sightline of the user via the eyepiece with a sensor, and controls the camera, telescope or microscope focus or zoom in accordance with the sightline. As the sightline is determined from image information of the retina of the user, such a system is largely independent of the head movements of the user. The disadvantage is that this system is very complicated and the light path of the camera or microscope must be modified, and consequently, leads to a lower object image quality. Moreover, the eye naturally performs jerking movements which influence the evaluation of the image information and can lead to undesired results. However, the long term fixing of an image point leads to rapid fatigue and represents a major disadvantage, particularly, when working on microscopes.

Systems are also known which permit a contactless control of the positioning of a microscope relative to the object. U.S. Pat. No. 5,345,087, describes a system for the contactless, spatial positioning of surgical microscopes. For this purpose, the head of the user and the eyepiece of the microscope are provided with an additional transmission and reception unit whose mutual, relative positioning determine the position of the microscope in space. The disadvantage is that for determining the position, in addition to the modification of the microscope, elements must be fixed to the user which, as a result of incorrect manipulation, can represent a source of error, unnecessarily increase the costs of such a system, and which are uncomfortable to wear for a long time.

The problem of the invention is to develop a different, simple and reliable system for the contactless control of a microscope.

SUMMARY OF THE INVENTION

According to the invention, this problem is solved by a microscope control system with a sensor unit, an evaluating unit, and at least one drive unit, the sensor unit being connected to the evaluating unit, and the evaluating unit to the at least one drive unit the sensor unit has at least one movement or motion sensor the evaluating unit calculates the data received by the sensor unit and transmits a control signal to the at least one drive unit, and the at least one drive unit drives means adjusting the physical characteristics of the microscope.

The microscope control system according to the invention has the advantage compared with known systems that a control of microscope-relating parameters, such as e.g. magnification or focus or position relative to the object, can be performed adequately, precisely, and largely reliably using simple inexpensive means.

BRIEF DESCRIPTION OF THE DRAWINGS

Further advantages and features of the present invention can be gathered from the following description of the preferred embodiment relative to the attached drawings, wherein.

DETAILED DESCRIPTION OF THE PREFERRED EMBODIMENT

Figure 1:
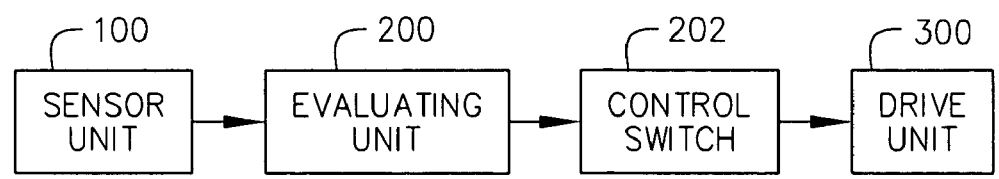
FIG. 1 shows a diagrammatic representation of the control system for microscopes.

FIG. 1 reveals the link between the individual elements of the control system. The sensor unit 100 is connected to the evaluating unit 200, which evaluates the data transmitted by the sensor unit 100 and transmits control instructions to the at least one drive unit 300 for the adjustment of the at least one physical characteristic of the microscope.

Figure 2:
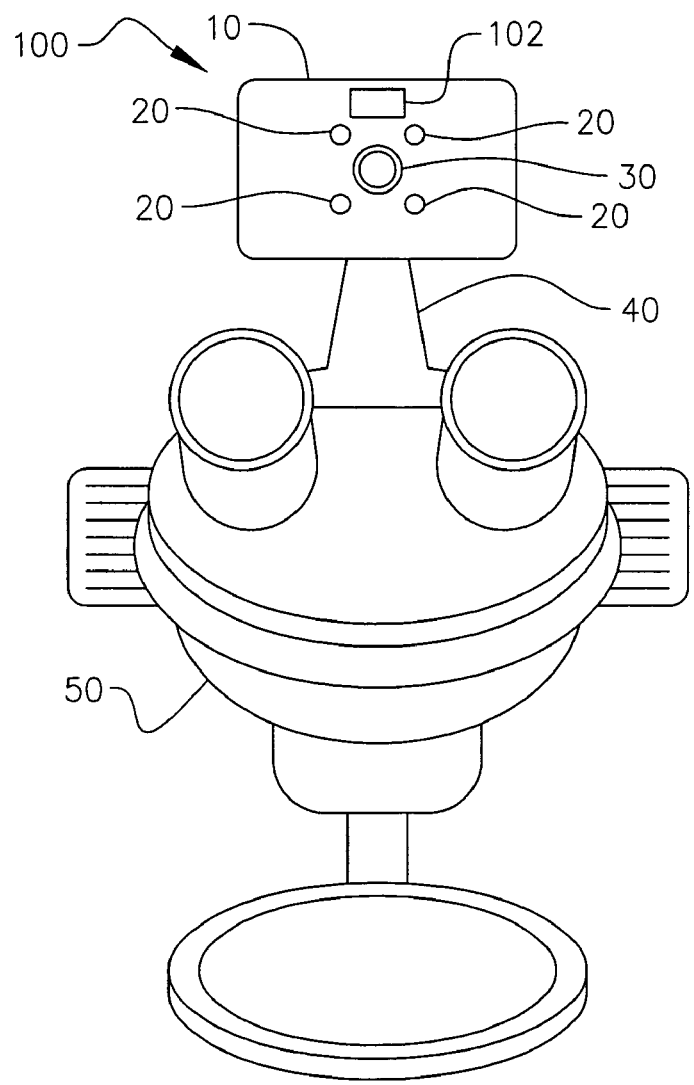
FIG. 2 shows the microscope with sensor device.

In the manner shown in FIG. 2, the sensor unit 100 is located in a sensor housing 10 and is fitted via the mounting arm 40 to the microscope 50, and preferably, incorporates at least one light emitting diode 20 and a motion or movement sensor 30. The particularly preferred four light emitting diodes 20 shown in FIG. 2, illuminate the front of the microscope user 70, shown in FIG. 3, in a uniform manner in the area relevant for the movement sensor 30. The movement sensor 30 (e.g. an ADNS 2030 of Agilent Technologies) records the movements of the front of the microscope user 70 in both the x and y directions. By adding further movement sensors, it is possible in a particularly preferred embodiment to determine rotary movements in the plane of the front.

By programming the evaluating unit 200, it is predetermined which characteristic of the microscope is to be influenced or controlled by the data established by the movement sensor 30. Apart from physical characteristics relating to the microscope, such as e.g. magnification, focus, diaphragm settings, illumination or position relative to the object, it is also possible to control with the control system the environment of the microscope., i.e., instruments other than the microscope. In a preferred development of the invention, the physical characteristic of the microscope to be modified can be selected by means of one or more switches (202). As a result of this selection, the control instruction of the evaluating unit 200 is transmitted to the selection-concerning drive unit 300 which effects the adjustment using suitable means. It is also possible to deactivate the control system by means of a switch. This is particularly important if the microscope user 70 wishes to leave the workplace without modifying the settings made or so that unintentional head movements during the working phase do not influence the settings made.

According to a preferred embodiment of the invention, the sensor unit 100 additionally contains a spacing or distance sensor 102, which on exceeding the distance between the movement sensor 30 and the microscope user 70, indicates by means of acoustic or optical signals that the inventive control system is inactive. The exceeding of a distance and the recording by the distance 102 sensor preferably act as switches which, as described hereinbefore, deactivate the control system. In a particularly preferred variant, the distance sensor 102 controls by means of the evaluating unit 200 a suitable drive unit 300 fitted to the mounting arm 40, and which follows the sensor unit 100 on exceeding a defined distance, and consequently, maintains a constant distance from the microscope user 70.

Figure 3:
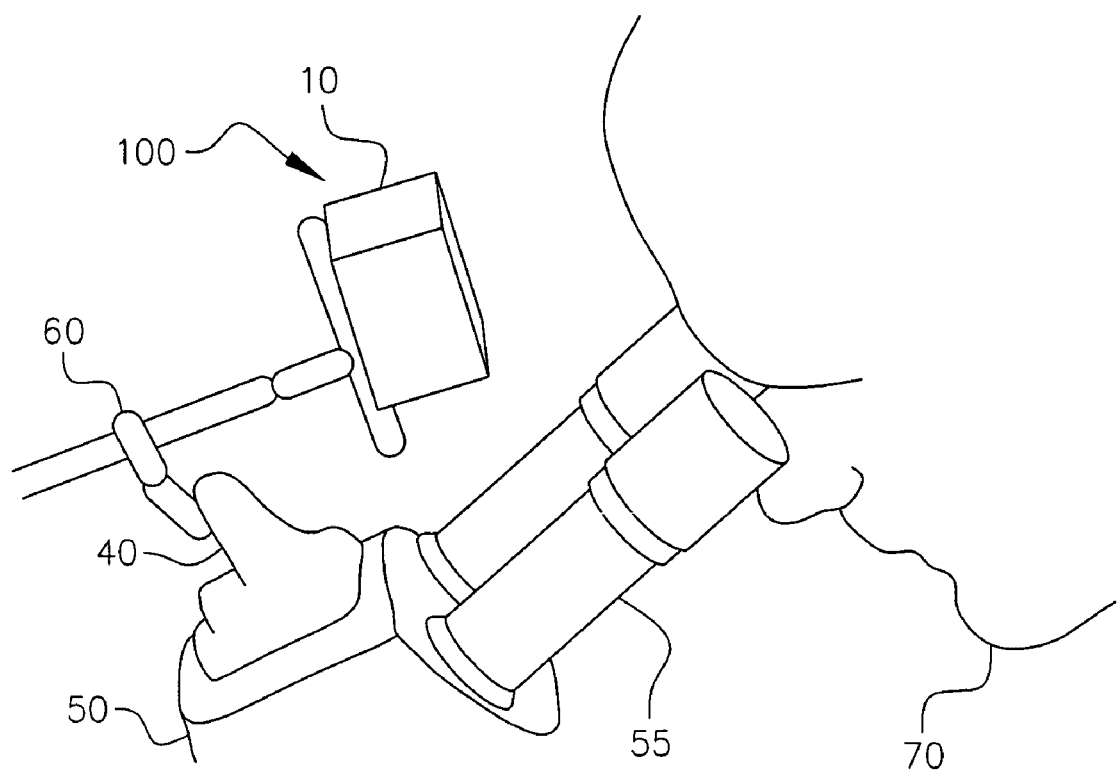
FIG. 3 shows a perspective view of the elements for positioning the sensor device with respect to the user.

FIG. 3 perspectively shows the diagrammatic representation of FIG. 2 when using the microscope. The sensor unit 100 is positioned by a holding device 60 which is connected to the microscope 50 by the mounting device 40 in the spatial proximity with respect to the forehead of a viewer 70 looking through the eyepiece 55. The holding device 60 comprises a rod system connected in hinge-like manner allowing a rotation of the sensor unit 100 in all directions. It is possible to modify the sensor unit 100 in its distance from the viewer 70, and its distance from the microscope 50 (height). To ensure that the system operates in an optimum, trouble-free manner, it must be ensured that the sensor unit 100 is brought into spatial proximity to the forehead of the user 70.

Figure 4:
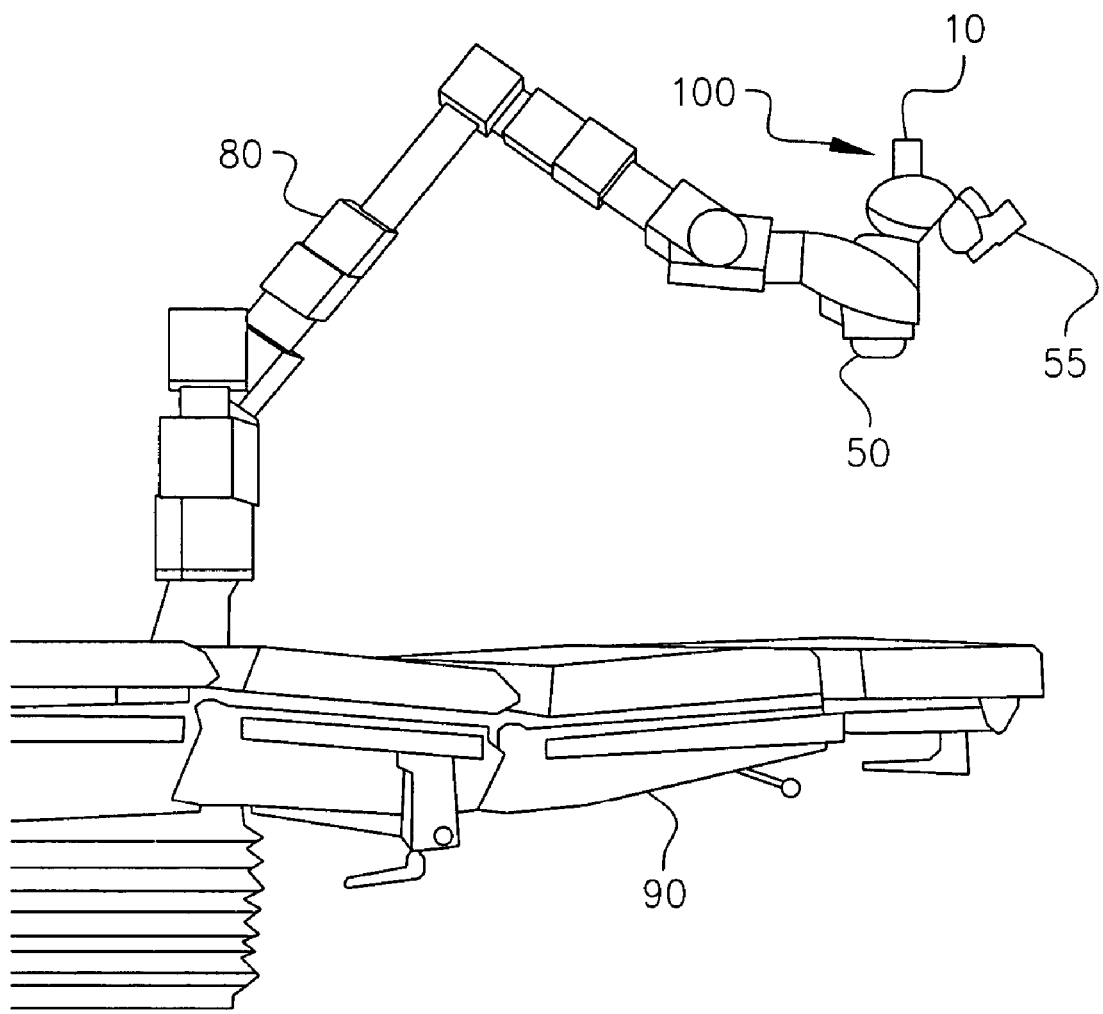
FIG. 4 shows a surgical microscope with sensor device.

Another application of the control system according to the invention is illustrated in FIG. 4. Here the sensor unit 100 is in the vicinity of the eyepiece 55 of a surgical microscope fixed by means of a robot arm 80 to an operating table 90. The surgeon performing operations where a microscope is required is frequently confronted with the problem that there are manually guided surgical instruments in the operating area, but he must simultaneously adjust the position or other parameters of the surgical microscope. The control system, according to the invention, permits the contactless positioning of tho surgical microscope, and the aforementioned, particularly advantageous design features, also have an effect.

The invention claimed is:

1. A Control system for microscopes, having a sensor unit, an evaluating unit, and at least one drive unit, the control system comprising:
   a) the sensor unit having at least one movement sensor affixed to the microscope and aligned with the head of the user for detecting head movements in both the x and y direction;
   b) the sensor having at least one light emitting diode for illuminating the head of the user in a uniform manner, whereby the sensor receives reflected light from the head of the user;
   c) the evaluating unit calculating data received by the sensor unit and transmitting a control signal to the at least one drive unit;
   d) the at least one drive unit containing means for driving the unit so that at least one physical characteristic of the microscope is adjusted.

2. The control system according to claim 1, wherein the means for driving at least one drive unit adjusts the magnification, focus, position relative to the object, or lighting of the microscope.

3. The control system according to claim 1, wherein the sensor unit contains a distance sensor directed at the head of the microscope user.

4. The control system according to claim 3, wherein the sensor unit contains an additional movement sensor directed at the microscope user.

5. The control system according to claim 1, wherein the control signal from the evaluating unit is allocated to a drive unit by means of a switch.

6. The control system according to claim 1, wherein the sensor unit contains four light emitting diodes.

* * * * *